July 30, 1963 B. P. SHEESLEY 3,099,544
METHOD OF DECORATING SURFACES WITH A VISCOUS FLUID
Filed Aug. 25, 1960 2 Sheets-Sheet 1
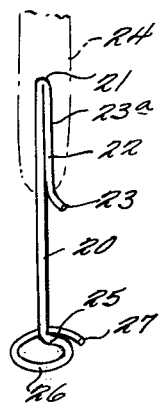
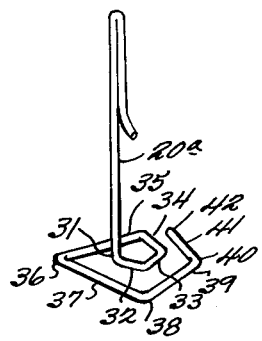
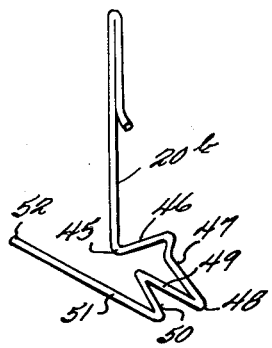
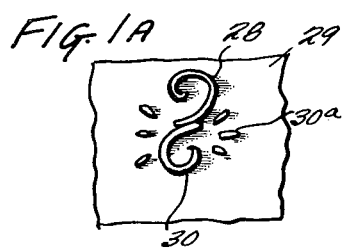
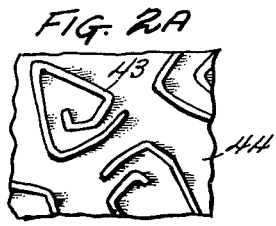
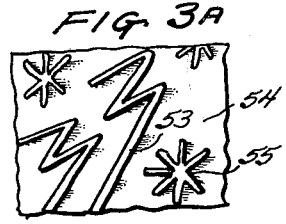
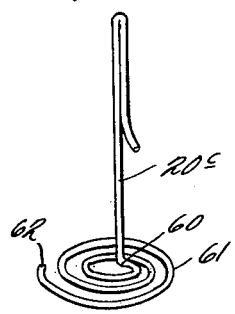
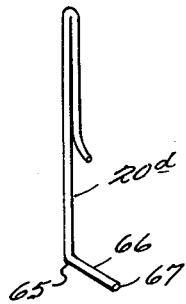
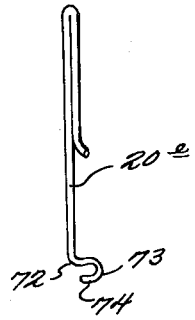
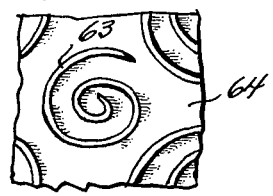
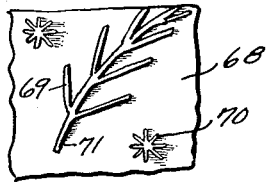
INVENTOR.
BEUFORD P. SHEESLEY
BY
Kimmel & Crowell
ATTORNEYS July 30, 1963  B. P. SHEESLEY  3,099,544
METHOD OF DECORATING SURFACES WITH A VISCOUS FLUID
Filed Aug. 25, 1960  2 Sheets-Sheet 2
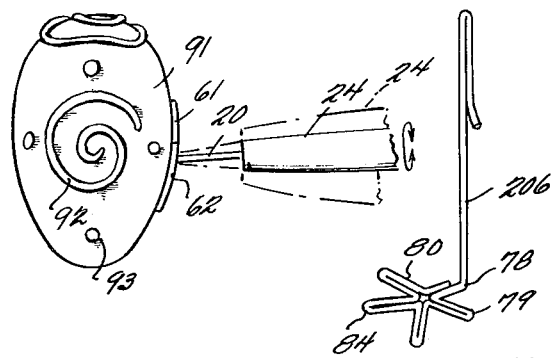
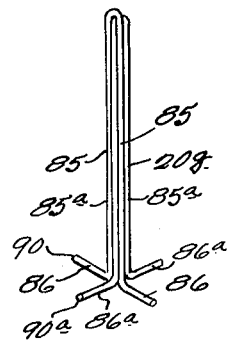
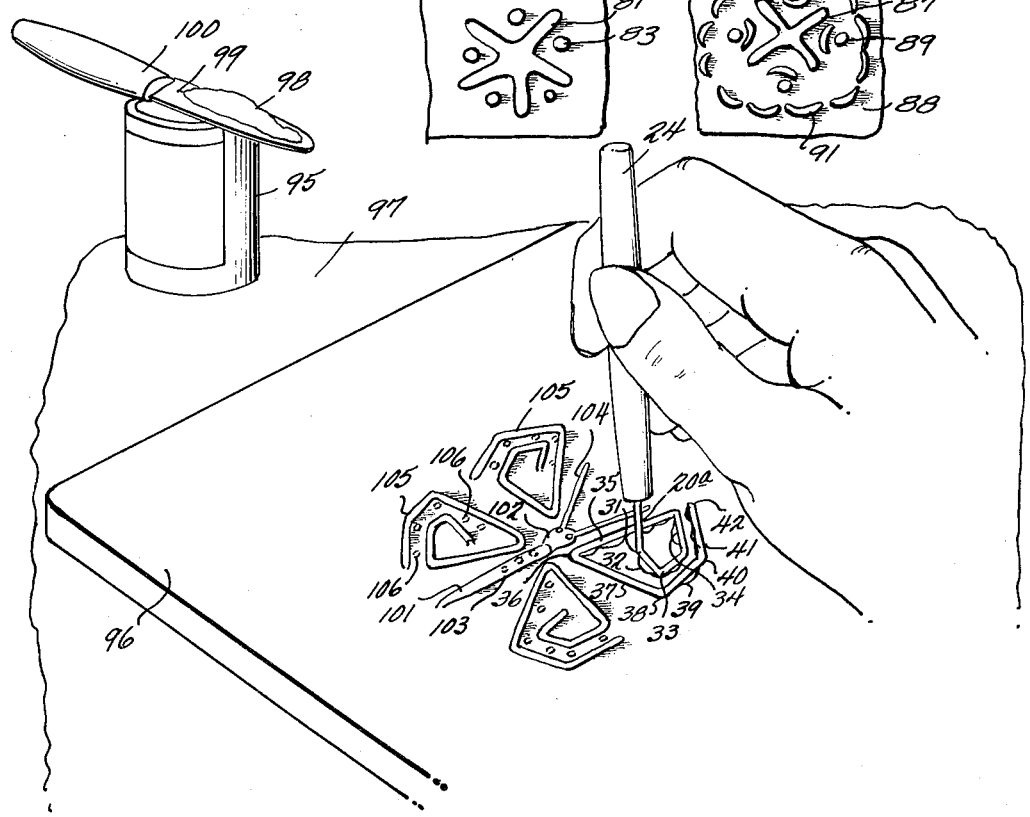
INVENTOR.
BEUFORD P. SHEESLEY
BY
Kimmel & Crowell
ATTORNEYS

3,099,544
METHOD OF DECORATING SURFACES WITH A VISCOUS FLUID
Benford P. Sheesley, Boise, Idaho
Filed Aug. 25, 1960, Ser. No. 51,838
6 Claims. (Cl. 41—26)

This invention relates to a method of decorating surfaces with a viscous fluid, and a tool for carrying out this method, and comprises a continuation-in-part of my co-pending applications Serial Nos. 664,712 entitled "Decorating Tool," filed June 10, 1957, and Serial No. 804,954 entitled "Method of Decorating Surfaces With a Viscous Fluid," filed April 8, 1959, now both abandoned.

A primary object of this invention is the provision of an improved method or process of decorating the flat or curved surfaces of articles such as ceramic vases, pitchers, plates, cups, saucers, panels, glass panels, plates or panes, porcelain articles, gift packages, wax candles, plastic bells, or ornaments or analogous articles with such varicolored mediums as decor, bead or lava glaze, thickened underglaze colors, colored slip or liquid clay, engobes, texture glazes, brocade glaze, embossing glaze or any other thick liquid of creamy consistency and a viscosity corresponding approximately to that of whipped cream, in a wide variety of selected ornamental designs in a manner to ensure a clear and concisely accurate desired raised or embossed or relief design with a minimum possibility of smearing, marring, or otherwise disfiguring the design.

A further very important object of the invention resides in the provision of an improved tool or applicator by means of which the method of the instant invention may be most advantageously carried out, the tool comprising a handle and a yieldable applicator member having a shank which extends in parallel relation to the handle, the applicator being disposed in a plane perpendicular to the shank and comprising a plurality of strands spaced sufficiently from one another to avoid capillary attraction with a fluid of the specified viscosity.

An additional object of the invention resides in the provision of such a tool wherein the applicator is comprised of yieldable flexible fine spring wire coiled, bent, or convoluted in such a manner as to provide a raised ornamental design which may be applied to an irregular or curved surface as well as a flat surface, the yieldable material being manually conformable accurately to the contour of such surface so that the design to be applied may be positioned over arcuate concave or convex, or angled, or other irregular surfaces without losing the continuity thereof.

Still another object of the invention is the provision of such a brocade tool wherein the applicator portion, by virtue of its positioning in a plane perpendicular to the shank enables the tool to be tilted, turned, or rotated in any desired direction to form a selected design or variation thereof such as scallops, saw-tooth edges, flowers, leaves, pin dots, polka dots, pine cones, pine branches, pine needles, butterflies, star flowers, overall brocade, or the like with a minimum of effort and difficulty, and which requires only nominal skill and a minimum of practice so that an unskilled worker may achieve accurate finished and substantially perfect designs.

As conducive to a clearer understanding of this invention, it may here be pointed out that the decoration of ceramic surfaces with various ornamental designs has long been known, and various methods and applicator tools have been employed for this purpose. Heretofore such tools have, in the main, comprised either brushes or relatively rigid inflexible pointed tools, the glaze or analogous material being applied either with a brushing or smearing motion, or by pinpointing. When a brush is used, obviously a fine line design is extremely difficult to achieve, and with the pinpointed rigid tool, a design of any complexity is not only extremely tedious, but elongated or linear portions thereof will tend to come out in the form of a series of globules or dots, rather than a smooth even contiguous straight or curved line. By virtue of the applicator of the instant invention comprising a fine, flexible, yieldable, resilient wire disposed in perpendicular relation to a shank and formed in a selected ornamental design, the design may be readily transferred to such ceramic surfaces as pottery, porcelain, greenware, bisqueware, or other similar surfaces either in the exact form of the design of the applicator or of any selected portion thereof, or by merely turning, tilting, or rotating the applicator portion by means of a handle the design may be elaborated within a wide variety of permissible limits. The applicator of the instant invention is thus used, in effect, to apply a design conforming to that of the applicator or a portion thereof by a direct vertical stamping action on the surface being treated, rather than a linear or sweeping application as effected by the hitherto known devices for applying a glaze to a ceramic surface, and by virtue of the flexibility and yieldability thereof will conform to a curved, concave or convex surface or an irregular surface as desired, by merely rocking, tilting or rotating the tool without lifting the tool from the surface to which the design is to be applied.

A further object of the invention is the provision of such a tool wherein the applicator portion is formed from such flexible, resilient, yieldable material as wire of German silver or other non-corrosive material, to which such materials as slip or glaze, or liquid or paste, gold or silver, for application to edges, borders, or the like, or other desired material will adhere, such material being of sufficient viscosity to adhere to the individual strand or portion of the applicator body by capillary attraction for transfer to the ceramic to which it is to be applied, it being noted that in applicators of bent, spiral, or convoluted design it is necessary that the adjacent strands be spaced at a sufficient distance relative to each other to prevent the capillary adherence of the viscose fluid between adjacent strands.

The applicators in accordance with the instant invention are constructed in a wide variety of applicator forms, as will be discussed hereinafter, for the application of a selected design, or combination of designs or combinations of parts of designs, within the choice of the ceramist, the ceramic material to be decorated being of any desired size or shape, and the material applied thereto being of any selected color or colors and of any consistency or viscosity greater than that of water within the permissible limits of glaze or liquid or paste gold or silver or the like.

Still another object of the invention resides in the steps of the process, and the arrangements of parts, combinations of elements, and details of construction of the several applicators hereinafter described, all embodying the basic instant inventive concept, as shown in the accompanying drawings.

Still other objects will in part be obvious and in part become apparent as the description of the invention proceeds.

In the drawings:

FIGURE 1 is a perspective view of one form of applicator embodying features of the instant invention, a handle therefor being indicated in dotted lines;

FIGURE 1a is a plan view of one form of design made by the applicator of FIG. 1;

FIGURE 2 is a view similar to FIG. 1, the handle being omitted, of another form of applicator;

FIGURE 2a is a plan view of one of the designs made by the applicator of FIG. 2;

FIGURE 3 is a view similar to FIG. 2 of still another form of applicator;

FIGURE 3a is a plan view of a plurality of designs made by the applicator of FIG. 3;

FIGURE 4 is a similar view of still another form of applicator;

FIGURE 4a is a plan view of a design made thereby;

FIGURE 5 is a perspective view of still another form of applicator;

FIGURE 5a is a plan view of designs made thereby;

FIGURE 6 is a perspective view of still another form of applicator;

FIGURE 6a is a plan view of a design pattern made thereby;

FIGURE 7 is a perspective view of still another further form of applicator;

FIGURE 7a is a plan view of a design made thereby;

FIGURE 8 is a perspective view of still another form of applicator;

FIGURE 8a is a plan view of a composite design made partially by the applicator of FIG. 8, and partially by other applicators;

FIGURE 9 is a plan view of the tool of FIG. 4 showing the design made thereby as applied to a curved surface; and FIGURE 10 is a perspective view showing the applicator of FIG. 2 in a position for use, together with an elaborate design made thereby.

Similar reference characters refer to similar parts throughout the several views of the drawing.

Having reference now to the drawings in detail, and more particularly in FIG. 1, there is shown one form of decorating tool embodying the instant inventive concept which includes a shank 20, which is reverted in 21, to form a depending resilient portion 22 having an outwardly flared tip 23. The shank is formed of flexible resilient wire, preferably of a material such as German silver, or similar non-corrosive material, and the reverted portion 21 is adapted to be positioned in a suitable bore 23a in a handle 24. The handle is best shown in FIG. 10, and a single handle may be used for a plurality of tools, although in practice it is preferable to supply each tool with an individual handle. The natural resiliency of the wire serves to hold the reverted portion 22 outwardly against the walls of the bore 23a to hold the shank securely in position.

In the form of the invention disclosed in FIG. 1 the shank or stem 20 terminates in a point 25 from which extends an integral single coil 26, terminating in a free end portion or toe 27, the portions 26 and 27 lying in a flat plane substantially perpendicular to the stem or shank 20 and forming the applicator proper.

The tool of FIG. 1 is particulary suitable for decorating small or medium size pieces with all-over brocade designs, borders, scallops, edges, roses, small cat tails, and other designs. When making the scallops or edges, only a portion of the tool is used. When the whole design is desired, as shown in FIG. 1a at 28, the whole tool is dipped into the decorating material, and applied gently to the surface 29 to be decorated. A reverse design such as 30 may be made by re-dipping the entire tool into the decor, and placing it is opposite relation. The elongated leaf designs 30a are made by dipping only the toe or tail of the tool into the decor, and appropriately applying the same, by holding the tool in edge-wise relation. After the design is finished, the entire article is fired in known manner.

FIG. 2 shows a modified form of the invention, which includes a shank 20a which is identical to that previously described, and needs no further elaboration. In this construction, however, the applicator differs in that at the lower extremity of the shank there is provided a point 31, from which a portion 32 extends outwardly at right angles. An acutely angled extension 33 terminates in a second acutely angled portion 34, from which a short outer side 35 extends also an acute angle, but at a lesser angle than that between the portions 32 and 33 so that it is positioned outwardly of the shank or stem 20a. A relatively sharp angle 36 forms the point of this tool, from which a long side 37 extends to a shoulder 38. A shorter portion 39 then extends to a bend 40, from which an elongated portion 41 extends to an acute angle to free end or tail 42. This tool is particularly adaptable to the formation of embossed ail-over brocade designs, various size and depth pointed scallops, small saw-toothed edges, flower centers, dots, holly or snow berries, pine cones, and other designs such particularly as the elaborate butterfly design disclosed in FIG. 10, and to be more fully discussed hereinafter. The design of FIG. 2a as shown at 43, is formed by dipping the entire applicator into the decorating material and pressing it with straight, direct pressure, as with a stamp, althought gently, onto the surface 44 to be decorated.

A further modified form of tool is shown in FIG. 3 and includes a shank 20b substantially identical to the shank 20 previously described, and terminating at 45 in a right angularly offset portion 46. From this portion an offset extension 47 leads to an acutely angled bend 48, from which integral zig-zag portions 49 and 50 extend. Angularly offset from portion 50 is an elongated extending member 51, which terminates in the tail or toe 52. This design is particularly suitable for modernistic designs, such as simulated lightning or the like, for all-over brocade. It is also adapted by virtue of the elongated portions 51 to the formation of straight stems, lines and branches, fern-like sprays, cattail leaves, pine needles, etc. One such design is indicated at 53 in FIG. 3a as applied to the decorative surface 54. The tool is also adapted for the formation of star-like designs such as indicated at 55.

A further modification is shown in FIG. 4, and comprises a stem or shank 20c identical to those previously discussed, which terminates at a point 60, from which extends a helix or coil 61 which terminates in a toe or tail 62. The coil 61 lies in a plane perpendicular to the stem 20c, and differs from the modification of FIG. 1 in the number of turns therein, the coil 61 comprising three substantially complete convolutions, which enable the device to form designs which may not be effected by the tool of FIG. 1. One such design formed by the whole applicator is indicated at 63 in FIG. 4a on a surface 64 to be decorated. This design is similarly effected by a gentle stamping pressure, and withdrawal of the tool, in a direct downward straight line. The tail 62 may be employed for other purposes in a manner similar to the tail 52 of the tool of FIG. 3. This particular tool is adapted for embossed spiral brocade designs and is additionally suitable for an all-over brocade embodying single, double, or triple scallops, curved stems, and larger modernistic cattails, as well as a variety of other designs.

In all of the previously described modifications of the device, it is noted that the spacings of the various portions is sufficient to prevent the formation of a capillary film between any two adjacent horizontal members, thus insuring a clear and concise design characterized by the complete absence of smears or blots. The spacing is effected in consideration of the viscosity of the particular fluid used, which, as previously pointed out, is generally greater than the viscosity of water, but which may vary, within relatively wide limits in accordance with the particular material being applied.

FIG. 5 shows a simplified form of the invention which includes a shank 20d, which terminates in a point 65, from which a substantially straight sole portion 66 extends at right angles. The sole portion terminates in a toe or tail 67. The tool of FIG. 5 is particularly adapted for decorating close or difficult areas, and is excellent for applying small designs on small or dainty pieces. The tool may be used for embossed daisies, starlike designs and flowers, forget-me-not petals made and spaced two at a time, tiny flowers, flower centers, dots, shorter pine needles, and the like. The design of FIG. 5a, for example, on decorative surface 68 may have the extending portions 69 thereof formed by the sole 66 of the tool of FIG. 5, while the star-like design 70 may be made by dipping all or a portion of the sole 66 into the decor or decorating material, or with merely the toe or tail 67. The curved portion or step 71 of the central decoration may be made either with the outer portion of the coil 61 of the tool of FIG. 4, or may be made in sections with the sole 66 of the tool of FIG. 5.

A further modification of the invention is disclosed in FIG. 6 wherein a shank 20e, substantially identical to the previous shanks, terminates in a point 72, from which extends a relatively short arcuate portion 73 terminating in a tail or toe 74. This design of tool is particularly applicable for such designs as all-over leaf-like brocade, small flower petals, small leaves, etc. It is also suitable for edges around collars, cuffs, petals, and borders on costumes or dresses on figurines, or similar usages. The design of FIG. 6a on surface 75 may be accomplished entirely by the tool of FIG. 7, the several arcuate portions 76 being formed with the entire arcuate applicator portion 73, while the dots 77 may be made by means of the end or tail 74.

Still another modification is shown in FIG. 7, wherein is shank 20f similar to the previously described shanks is bent to form a star-like design lying in a plane perpendicular to the stem, the stem terminating in a point 78, which forms the tip of one point of a star, and the fine flexible resilient wire being continuously bent therefrom, with the points of a star being reverted as at 79, to form a continuous five-pointed star 80. This design has particular application to star-shaped formations, and wherein it is desired to decorate broader areas than can be decorated by the single strands of the previous modifications. In this particular form it is desirable that a capillary film be formed between the adjacent or contacting points of the star, to provide a broader design as indicated at 81 on the decorative surface 82 of FIG. 7a. The dots 83 may be formed by any one of the points 84 of the star-shaped applicator of FIG. 7.

Still another form of applicator is disclosed in FIG. 8, wherein the shank portion 20g differs from those previously described in that it is comprised of a pair of spaced parallel reverted legs 85, which terminate in outwardly extending right angled sole portions 86. A second substantially identical member is provided with parallel legs 85a, which terminate in outwardly extending right angled sole portions 86a which in turn are arranged at right angles to the portions 86. The legs 85 and 85a are simultaneously inserted in the bore in the handle. A cruciform design such as indicated at 87 in FIG. 8a may be formed on the decorative surface 88. A plurality of other designs, such as the dots 89 may also be formed by the tips 90 and 90a of the extending sole portions 86 and 86a, respectively. The scallops 91 of the design of FIG. 8a may be made by means of a tool of FIG. 6, as illustrative of the combining of the several designs which may be formed by the several tools for producing an almost infinite multiplicity of decorative and ornamental brocade designs.

FIG. 9 discloses, illustratively, the tool of FIG. 4 as employed in making a design on an arcuate surface, as for example, embossing an egg-shaped article 91. As indicated in dotted lines, the tool after its initial straight pressure to the immediately adjacent portion of the arcuate surface is generally rotated as shown by the arrow. The resiliency and flexibility of the coil 61 thus enables all parts of the tool to form the entire design 92, as shown, without the necessity of raising or lifting the tool from the arcuate or curved article being decorated. The entire design may be completed in a single operation. Similarly, changes in the designs may be effected by moving any one of the previously described tools laterally to broaden the lines, or, by imparting a slight rotative movement thereto, any of the tools may be employed to apply a design to a curved or arcuate surface. The dots 93 may be made by the point 36 of the tool of FIG. 2, or by the tail of any of the other tools as previously described.

FIG. 10 discloses an elaborate design which is preferably made by the tool of FIG. 2. In a preferred method of use the can 95 containing the decorative material to be applied to the surface 96 to be decorated, is positioned on a support 97 such as a table adjacent the desired surface. The decorative material, which may comprise, as previously stated, decor, bead or lava glaze, thickened underglaze colors, colored slip or liquid clay, engobes, texture glazes, brocade glaze, embossing glaze, or when desired glue, such as Elmer's glue (as will be described hereinafter). A small portion of the decor 98 is removed from the can 95 and placed on the blade 99 of a conventional pallet knife 100 or the like. The handle 24 of the tool is then grasped by the hand as shown in FIG. 10, and, in the case of the particular butterfly design used as an illustration the long side 37 of the tool is dipped into the decor, to form the body outline 101. A straight line is first formed, and elongated by making a second line which is joined thereto, if necessary. The head 102 and the dots 103 on the body line are made with the point 36 of the tool by drawing it toward the operator with a quick sweeping motion, which enables the point to pick up more of the decor for making larger dots such as the head. The long side 37 of the tool is then dipped into the decor to make the feelers or antenna 104, while the wings 105 are formed by dipping the entire surface of the applicator into the decor and pressing gently on the surface 96 in the positions indicated. The added dots 106 may be made with the point 36 of the implement.

When glue is used it is desirable to coat the several portions of the body by sprinkling, while still wet, with silver, gold or colored glitter, ballantine, sequins, flock, or the like. This produces a highly effective ornamental appearance, and may be also employed with any of the other tools herein described, by the use of Elmer's glue or similar glue.

After a piece to be ornamented has been completely decorated, it is allowed to dry thoroughly. In the case of an article such as packages, wax candles, or the like, obviously no firing is necessary. However, in the case of ceramic, porcelain or glass articles, a single firing after thorough drying is generally sufficient. Obviously, the technique will differ in accordance with both the material to be decorated, and the decorative material employed therewith.

From the foregoing it will now be seen that there is herein provided a method of decorating and ornamenting articles in a nearly infinite variety of designs, which designs may, by virtue of the several decorative tools comprising a part of the instant invention, be repeated at will, which accomplishes all of the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative, and not in a limiting sense.

I claim:

1. The process of utilizing an article of manufacture having an elongated handle and a continuous flexible wire bent to form a stem member secured in said handle and a plurality of spaced co-planar elements disposed substantially perpendicularly to said stem member comprising dipping at least a portion of said wire into and out of a supply of a material of a viscosity sufficient to preclude formation of a capillary film of the same between said elements of said wire, some of the material remaining on the individual elements of said portion in clinging relationship, engaging said portion carrying said material against a surface to be decorated, applying light pressure to said portion substantially perpendicularly of the surface to deposit the material on the surface in a pattern substantially corresponding to the configuration of said dipped portion, and removing said portion from the surface, the viscosity of the material also being sufficient to prevent flowing of the same whereby the material projects in raised relationship to the surface to which it has been applied.

2. A process in accordance with claim 1 wherein different portions of said wire are successively dipped into and out of the material, engaged with the surface under light, substantially perpendicular, pressure, and removed therefrom, whereby a predetermined design having the material projecting in raised relationship to the surface is produced.

3. A process in accordance with claim 1 wherein said bent wire terminates in a free end and said portion is limited to said free end.

4. A process in accordance with claim 1 wherein said bent wire defines a relatively sharp angle and said portion is limited to said angle.

5. A process in accordance with claim 1 wherein said bent wire defines at least one elongated straight element and said portion is limited to said last-mentioned element.

6. A process in accordance with claim 1 wherein said bent wire defines at least one arcuate element and said portion is limited to said last-mentioned element.

References Cited in the file of this patent

UNITED STATES PATENTS

| | | |
|---|---|---|
| 527,210 | Margot | Oct. 9, 1894 |
| 693,420 | Mueller | Feb. 18, 1902 |
| 781,250 | Welch | Jan. 31, 1905 |
| 1,868,230 | Hardesty | July 19, 1932 |
| 1,911,875 | Bausman | May 30, 1933 |
| 2,216,017 | Matthes | Sept. 24, 1940 |

OTHER REFERENCES

Vogel: Qualitative Chem. Analysis, pages 107, para. 1 and 112, para. 2, published March 1945 by Longmans Green & Co., N.Y.